United States Patent [19]
Peeters

[11] Patent Number: 5,664,535
[45] Date of Patent: Sep. 9, 1997

[54] GAS COMBUSTION ENGINE, AND METHOD OF MANUFACTURING THE GAS COMBUSTION ENGINE

[75] Inventor: Alexander Antonius Marinus Peeters, Oosterhout, Netherlands

[73] Assignee: P. Van Tilburg-Bastianen Revisie B.V., Breda, Netherlands

[21] Appl. No.: 602,812

[22] PCT Filed: Aug. 23, 1994

[86] PCT No.: PCT/NL94/00199

§ 371 Date: Feb. 26, 1996

§ 102(e) Date: Feb. 26, 1996

[87] PCT Pub. No.: WO95/06196

PCT Pub. Date: Mar. 2, 1995

[30] Foreign Application Priority Data

Aug. 26, 1993 [NL] Netherlands ............... 9301482

[51] Int. Cl.$^6$ .................................................. F02F 3/00
[52] U.S. Cl. .............................. 123/193.4; 123/27 GE; 123/526
[58] Field of Search ........................... 123/193.4, 193.6, 123/527, 526, 27 GE

[56] References Cited

U.S. PATENT DOCUMENTS

| | | | |
|---|---|---|---|
| 3,077,189 | 2/1963 | Earnshaw et al. | |
| 3,703,886 | 11/1972 | Witzky . | |
| 4,306,532 | 12/1981 | Camacho | 123/525 |
| 4,843,558 | 6/1989 | Bergmann et al. | 123/527 |
| 5,070,850 | 12/1991 | Davis et al. | 123/527 |
| 5,315,981 | 5/1994 | Chen | 123/27 GE |
| 5,327,813 | 7/1994 | De Bell et al. | 123/193.6 |
| 5,408,957 | 4/1995 | Crowley | 123/27 GE |
| 5,487,362 | 1/1996 | Weller et al. | 123/526 |
| 5,531,199 | 7/1996 | Bryant et al. | 123/527 |

FOREIGN PATENT DOCUMENTS

| | | |
|---|---|---|
| 2 490 730 | 3/1982 | France . |
| 2 619 415 | 2/1989 | France . |
| 56-006043 | 1/1981 | Japan . |
| 1305415 | 4/1987 | U.S.S.R. ............... 123/193.6 |
| 467818 | 6/1937 | United Kingdom . |
| WO91/14086 | 9/1991 | WIPO . |

OTHER PUBLICATIONS

SAE Abstract of document No. 880149, Feb. 1988.
SAE Abstract of document No. 950469, Feb. 1995.
by Grohe, Heinz, "Vorwort", *Otto– und Dieselmotoren*, pp. 5, 150 and 151. 1973.

*Primary Examiner*—Erick R. Solis
*Attorney, Agent, or Firm*—Young & Thompson

[57] ABSTRACT

In a gas combustion engine, which is manufactured by conversion of a diesel engine, the piston shape, the compression ratio, the air intake system and the exhaust gas system are modified. The exhaust gas system is split into two parts, each of which consists of an exhaust branch-piece and a catalyser, whereby catalysers of standard format can be employed, and the air intake system is made smaller, whereby the probability of backfire is reduced. The hollow in the piston already present in the diesel engine is enlarged in diameter and depth, in such a manner that the ratio of the diameter to the depth is equal to 30:11. In this manner, one achieves an optimal form with respect to heat extraction. In addition, enlargement of the hollow causes a lowering of the compression ratio to a value of 1:10, which is necessary when applying gas as a fuel. In addition, the edge of the piston near the top surface of the piston is bevelled, in order to compensate for extra expansion of the piston around the hollow, which extra expansion occurs as a result of the increased combustion temperatures. The costs of the above-specified conversion of a diesel engine to a gas combustion engine are hardly higher than those of a revision service of a diesel engine, so that there is no longer a financial obstacle to conversion to gas as a fuel.

11 Claims, 5 Drawing Sheets

GAS COMBUSTION ENGINE, AND METHOD OF MANUFACTURING THE GAS COMBUSTION ENGINE

BACKGROUND OF THE INVENTION

1. Field of the Invention

The invention relates to a gas combustion engine comprising a gas exhaust system, an air intake system, an engine block comprising a number of cylinders and pistons, which pistons can be translated in the cylinders, and a cylinder head which delimits the space in the cylinders at one extremity, whereby the volume of the space in a cylinder between the cylinder head and a piston can be varied between a minimal and a maximal value by means of the translatory motion of the piston, and the ratio of the said minimal and maximal values defines a compression ratio, and a combustion space is defined by the space in that state of the piston which corresponds to a minimal volume. The invention also relates to a method of manufacturing such a gas combustion engine.

2. Description of the Related Art

Trucks and buses in Europe are fitted standard with diesel engines, for economic reasons (power, lifetime, fuel consumption). An alternative for diesel engines is formed by gas combustion engines running on LPG or natural gas. Disadvantages of gas combustion engines, however, are that they have a lower power and a higher fuel consumption than diesel engines. In addition, gas combustion engines are more expensive than diesel engines. This is caused inner alia by the fact that gas combustion engines are not yet manufactured by mass production techniques, and by the fact that the trucks and buses are delivered standard from the factory with diesel engines, so that modification is required if such a vehicle is to be made suitable for incorporation of a gas combustion engine.

An increasingly important disadvantage of diesel engines, however, concerns their pollution of the environment with exhaust gases. Such pollution is very much greater in the case of diesel engines than in the case of gas combustion engines. Gas combustion engines are generally known to be relatively clean engines, which pollute the environment to only a slight extent with exhaust gases which are much cleaner than those produced by diesel engines. This disadvantage of diesel engines is of even greater significance in the case of transport in densely populated areas, particularly in cities. In such areas, the disadvantages of the said pollution are felt to a greater extent than outside cities.

In order to alleviate the problem with respect to pollution, ever-increasing numbers of vehicles for intended use in city traffic are being fitted with gas combustion engines. Such vehicles are predominantly new ones, which are used to replace older, written-off vehicles, and are provided with new gas combustion engines during production; alternatively, the new gas combustion engine in such vehicles is provided during a revision service, and is a complete replacement for a former written-off diesel engine in the vehicle. In both instances, special modifications to the vehicles are necessary before the gas combustion engines can be fitted.

However, since the economic lifetime of diesel engines is long, which, for financial reasons, tends to be a dissuading factor in possible early replacement of the diesel engines, a large percentage of all such vehicles will remain fitted with diesel engines in the coming years, even if all new vehicles and revised vehicles were to be fitted with gas combustion engines.

An object of the invention is the provision of a financially attractive solution to the problem of pollution hereabove elucidated. To this end, the gas combustion engine in accordance with the invention is characterised in that the gas combustion engine is a converted diesel engine, whereby the combustion space and the compression ratio are adapted to application of gas as a fuel, whereby the pistons have a cylindrical wall and a top surface, whereby a hollow is located in the top surface, which hollow forms part of the combustion space and has an approximately circle-cylindrical form and an approximately flat bottom and the hollow has a diameter and a depth, whereby the ratio of the diameter to the depth lies between 30:9 and 30:13. The diesel engine is preferably converted to a gas combustion engine during a revision service.

From WO 91/14086 the conversion from a diesel engine into a gas engine is known per se, but
without reducing the compression ratio;
without controling and varying the combustion point between 12° and 20° before TDC (top dead center) and
without controlling the gas/air ratio using lambda probes and an engine regulation unit.

Consequently this known engine has a short life expectation and a high pollution of the environment. The diesel engine is preferably converted to a gas combustion engine during a revision service. The diesel engine is not replaced by an other engine, so that no (or, at least, practically no) modifications need be made to the vehicle. Above all, most of the diesel engine remains suitable for use as a gas combustion engine without any modification, as a result of which the depreciation costs are affected to a minimal extent (or even not at all). The costs of such a conversion are only slightly higher than the costs of revision of the diesel engine, so that there are hardly any reasons for not converting the diesel engine to a gas combustion engine during a revision of the former. Above all, it has transpired that the power and lifetime of such gas combustion engines are hardly inferior to those of diesel engines.

In an embodiment of the gas combustion engine in accordance with the invention, the exhaust gas system and the air intake system are also adapted to application of gas as a fuel.

In a diesel engine, there is often a hollow in the top surface of the piston, on the bottom of which hollow is located a pointed protrusion serving to atomise the diesel fuel sprayed thereupon. A further embodiment of the gas combustion engine in accordance with the invention is characterised in that the exhaust gas system and the air intake system are also adapted to application of gas as a fuel. In this manner, the combustion space is given a form which is advantageous to a gas combustion engine, whereby an homogeneous mixture of gas and air accumulates in the hollow during operation. In addition, the compression ratio is hereby lowered, which is necessary when using gas as a fuel.

The enlarged hollow has such a diameter and depth that the ratio of the diameter to the depth lies between 30:9 and 30:13. Such a ratio ensures good heat extraction from the combustion-heated surfaces of the wall and bottom of the hollow. If this ratio is far removed from the stated range, then that part of the piston located between the piston wall and the wall of the hollow is unable to sufficiently impart its heat to the rest of the piston, leading to damage to the piston, which is detrimental to the lifetime of the engine.

In a preferential embodiment, this ratio is equal to 30:11. In experiments, this ratio transpired to be optimal with regard to heat transfer.

A further embodiment of the gas combustion engine in accordance with the invention is characterised in that the wall of the piston is bevelled at the extremity near to the top surface, whereby the external diameter of the piston decreases from a first value, remote from the top surface, to a second value, at the position of the top surface. As a result of the above-elucidated heating of the walls of the hollow, arising from combustion of the fuel, that part of the piston located between the piston wall and the wall of the hollow expands. This expansion is larger in proximity to the top surface of the piston than in proximity to the bottom surface of the hollow, due to better heat extraction near the bottom. As a result hereof, the diameter of the piston increases in the direction of the top surface, causing the piston to press against the wall of the cylinder, as a consequence of which the piston wall eats into the cylinder wall, which can cause serious damage. However, as a result of the bevelling hereabove referred to, there is room between the piston wall and the cylinder wall, so that expansion of the piston wall will not cause the piston wall to touch the cylinder wall.

An advantageous embodiment is characterised in that a number of piston rings are located in the wall of the piston, and that the said bevelling extends as far as the top surface and begins at that piston ring which is located nearest to the top surface.

Yet another embodiment of the gas combustion engine in accordance with the invention is characterised in that the exhaust gas system comprises two exhaust branch-pieces, each of which is connected via a curved pipe to a separate catalyser, whereby the exhaust gas system is remotely located from an axial line of a cylinder such that the cylinder head is freely accessible, when viewed in a transverse cross-section of the engine block. As a result hereof, one has access to the intake valves, exhaust valves and spark-plugs present in the cylinder head, without having to remove the exhaust branch-pieces, or at least without being hindered by the presence of the exhaust gas system. As is well known, diesel engines are not fitted with catalysers. The most obvious means of incorporating a catalyser system would be to fit a single regulated catalyser in the existing exhaust gas system. However, an advantage of the current embodiment according to the invention is that, with two catalysers of standard format, the same effect can be achieved as with a single catalyser of larger format, and at reduced costs, since the cost of two standard-format catalysers is lower than that of the alternative catalyser of larger format. Moreover, as a result of splitting the exhaust gas system into two parts, the temperature is divided over both parts, so that less substantial temperature-peaks occur, which has an advantageous influence on the thermal loading of both the parts and the catalysers.

An embodiment associated herewith is characterised in that a lambda probe is located in each pipe for the purpose of providing information to an engine unit. As a result hereof, it is possible to obtain better regulation of the operation of the catalysers.

In addition to the advantages already cited, which apply equally to the method in accordance with the invention, an embodiment of the method in accordance with the invention is characterised in that the volume of the intake branch-piece is reduced, and that a gas carburettor is coupled to the intake branch-piece via a short pipe. During operation, the intake branch-piece contains a fuel-air mixture, containing the air sucked in by the piston motion and a quantity of fuel injected by the carburettor. As a result of a reduced volume in the intake branch-piece, as well as a small volume in the connection between the gas carburettor and the intake branch-piece, the consequences of a possible backfire (i.e. a spreading of flame from the cylinder to the intake branch-piece, via a valve opening) are reduced, due to the smaller quantity of mixture in the intake branch-piece. In addition, there is a quickened reaction of the engine to a change in the position of the accelerator pedal, since the supply of old mixture having a composition corresponding to a former position of the accelerator pedal is more quickly depleted, allowing the new mixture with the new composition to be obtained more quickly in the cylinders.

A further embodiment of the method in accordance with the invention is characterised in that atomiser openings in the cylinder head are enlarged in diameter, and that spark-plug mounting-bases are fitted in these openings. As a result hereof, standard spark-plugs can be employed, and the need for specially made spark-plugs (which would increase the costs of the conversion) is removed.

BRIEF DESCRIPTION OF THE DRAWINGS

The invention shall hereinafter be further elucidated on the basis of an exemplary embodiment as depicted in the drawing. To this end.

DETAILS OF THE PREFERRED EMBODIMENTS

Figure 1:
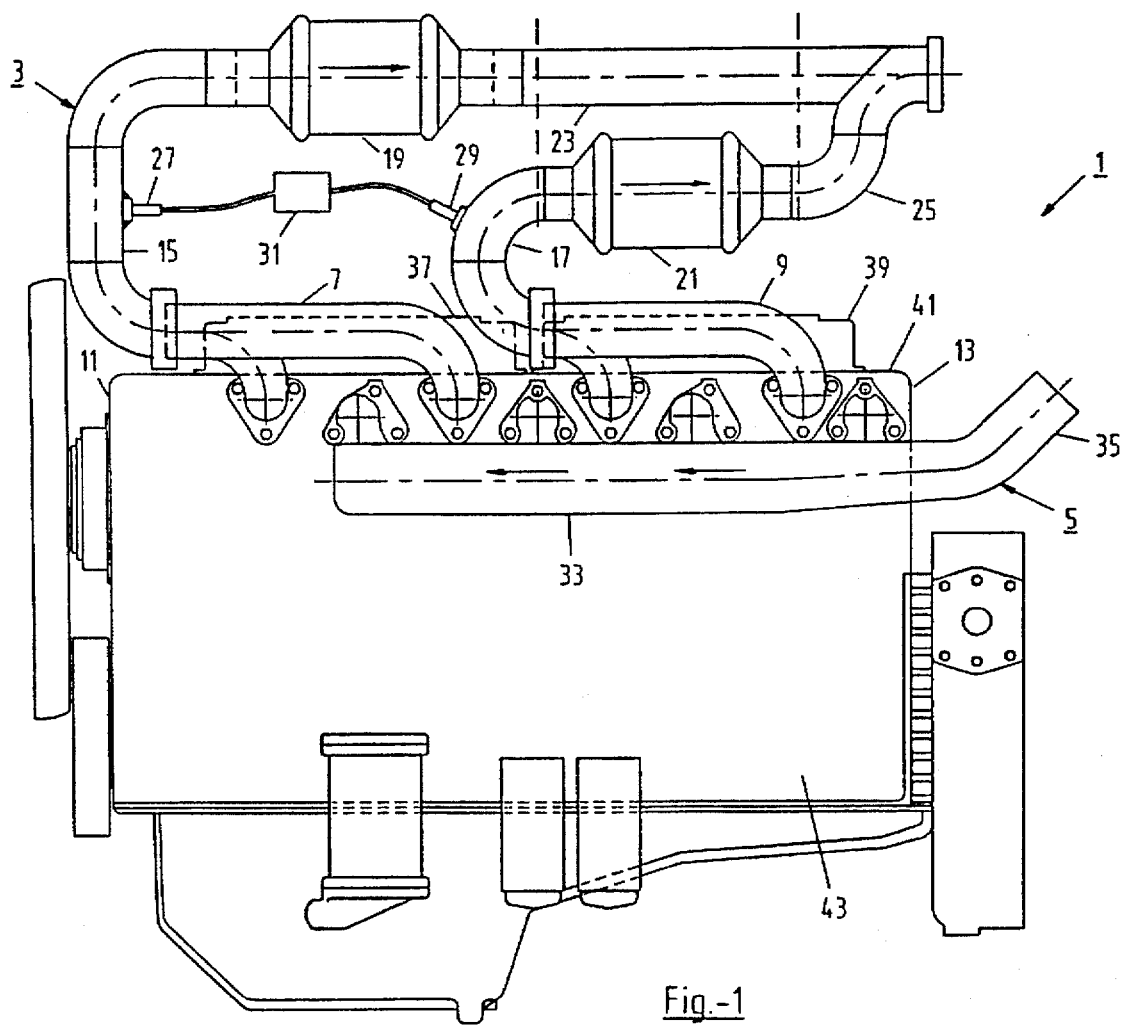
FIG. 1 renders a plan view of a gas combustion engine in accordance with the invention.

FIG. 1 shows a plan view of the gas combustion engine 1 in accordance with the invention. This gas combustion engine is a converted diesel engine, in which inter alia the exhaust gas system 3 and the air intake system 5 are modified. In addition, the pistons and the cylinder head are modified, which, however, is not visible in this figure. The new exhaust gas system comprises two exhaust branch-pieces 7 and 9, which are each connected to two openings in respective cylinder head halves 11 and 13. The rightmost of both these openings is connected to an exhaust orifice of the rightmost cylinder, whereas the other opening is connected via a cylinder head half to two exhaust openings of two neighbouring cylinders. Both of the exhaust branch-pieces 7 and 9 are coupled to two catalysers 19 and 21 via two curved pipes 15 and 17. The exhaust pipes 23, 25 converge further up in the exhaust gas system 3. Lambda probes 27, 29 are located in the curved pipes 15, 17, which probes 27, 29 analyse the composition of the exhaust gases and provide an engine regulation unit 31 with a corresponding signal. This engine regulation unit 31 subsequently emits signals which are used to regulate the ignition-timing and the fuel supply.

The air intake system 5 comprises an intake branch-piece 33 which is connected to a non-depicted gas carburettor via a short pipe 35. The volume of the intake branch-piece 33 is reduced with respect to that of the original intake branch-piece of the diesel engine.

Upon each of the cylinder head halves 11, 13 is located a valve cover 37, 39, which can provide access to the intake and exhaust valves. The entire exhaust gas system is located at a level above that of the pistons with cylinder head halves 11, 13 and valve cover 37, 39. As a result hereof, the valve covers and cylinder head halves can be freely accessed, without experiencing hindrance from the exhaust gas system.

Figure 2:
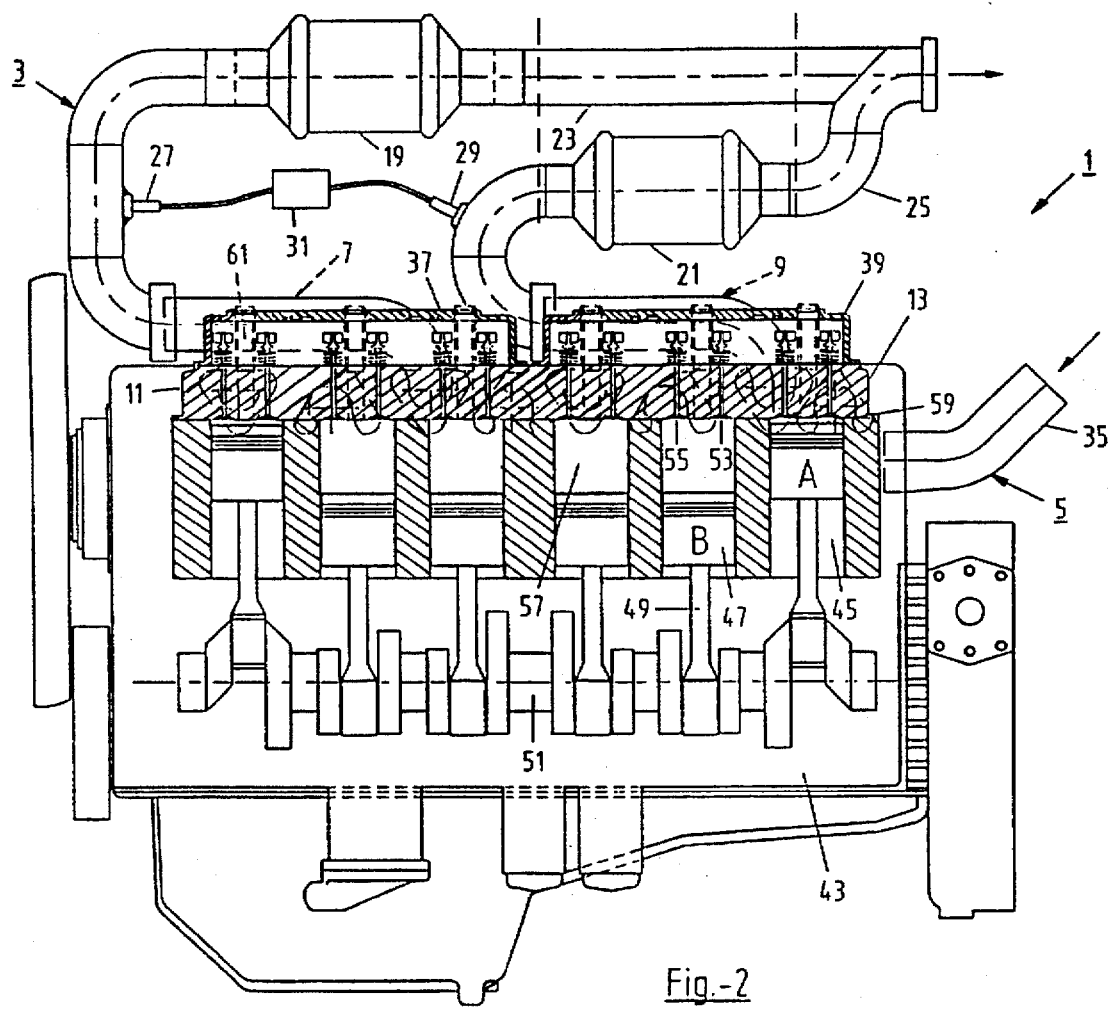
FIG. 2 shows a longitudinal cross-section of the gas combustion engine depicted in FIG. 1, FIG. 3 gives a plan view of a piston of the gas combustion engine.

FIG. 2 schematically depicts a cross-section of the gas combustion engine 1, whereby the exhaust gas system 3 is also shown, despite the fact that this system 3 is located at a higher level than the drawn cross-section. The exhaust branch-pieces 7, 9, which are located above the cylinder head 41 and engine block 43, are depicted with a dashed outline. There are six cylinders 45 present in the cylinder block 43, which cylinders contain translatable pistons 47. The pistons are connected to a crankshaft 51 via driving shafts 49. Each cylinder is connected to the intake branch-piece 33 and an exhaust branch-piece 7, 9 via an intake valve 53 and an exhaust valve 55, respectively. The volume of the space 57 within the cylinder between the piston and the cylinder head varies between a minimal value, in the uppermost position A of the piston, and a maximal value, in the undermost position B of the piston. The compression ratio, which is defined as the ratio of the said minimal value to the said maximal value, is in this embodiment equal to 1:10. In the uppermost position of the piston, the said space forms a combustion space 59. The combustion space 59 also extends into a hollow present in the piston.

This figure also depicts spark-plug mounting-bases 61 via a dashed outline.

Figure 3:
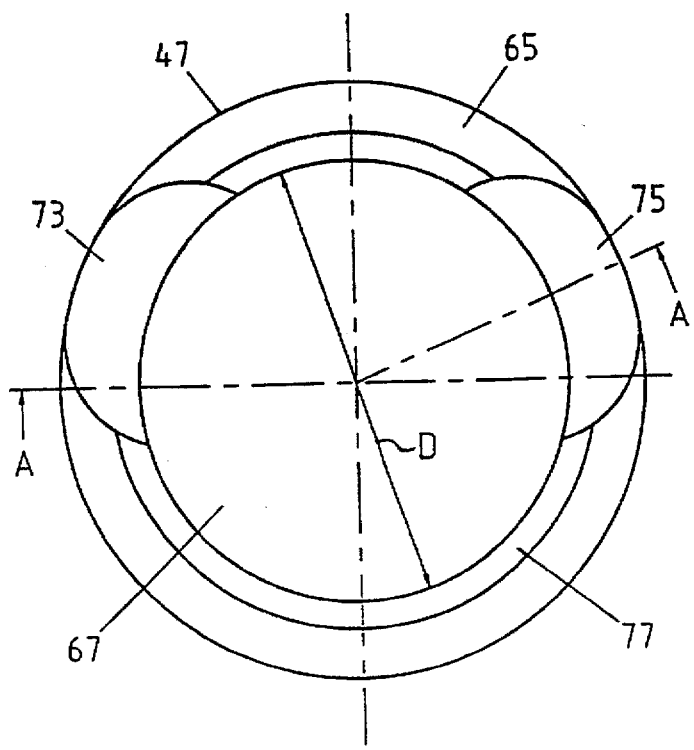
Figure 4:
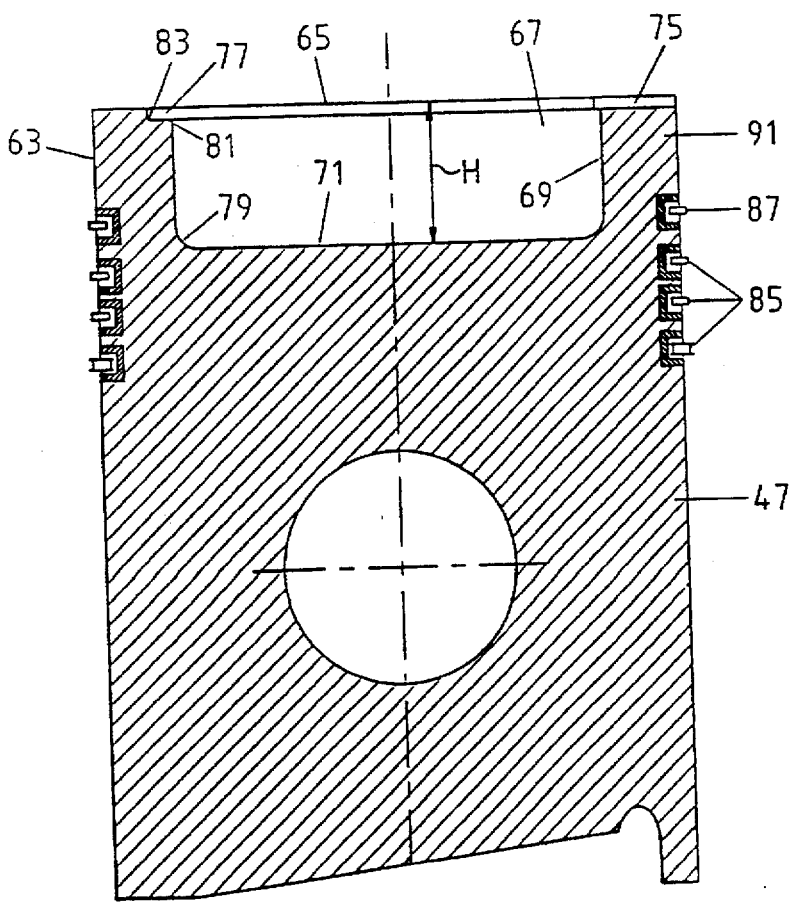
FIG. 4 depicts a cross-section along line A—A of the piston shown in FIG. 3.

FIGS. 3 and 4 respectively show a plan view and a cross-section of the piston, in which the said hollow is clearly visible. The piston 47 has a wall 63 and a top surface 65. The said hollow 67 is located in the top surface 65, and has a diameter D and a depth H, whereby the ratio of the diameter to the depth is equal to 30:11. The hollow 67 is delimited by a wall 69 and a flat bottom 71. Also located in the cylinder are two semi-circular hollows 73 and 75, which respectively prevent the intake valve and exhaust valve from coming into contact with the piston 47 in its uppermost positions. In the top surface 65 of the piston 67 is also located a shallow, ring-like hollow 77, serving to optimise the form of the piston. All corner points 79, 81 and 83 are rounded off, so as to inhibit the possible formation of fine cracks. In the wall 63 of the piston are located hollows in which piston rings 85, 87 are present.

Figure 5:
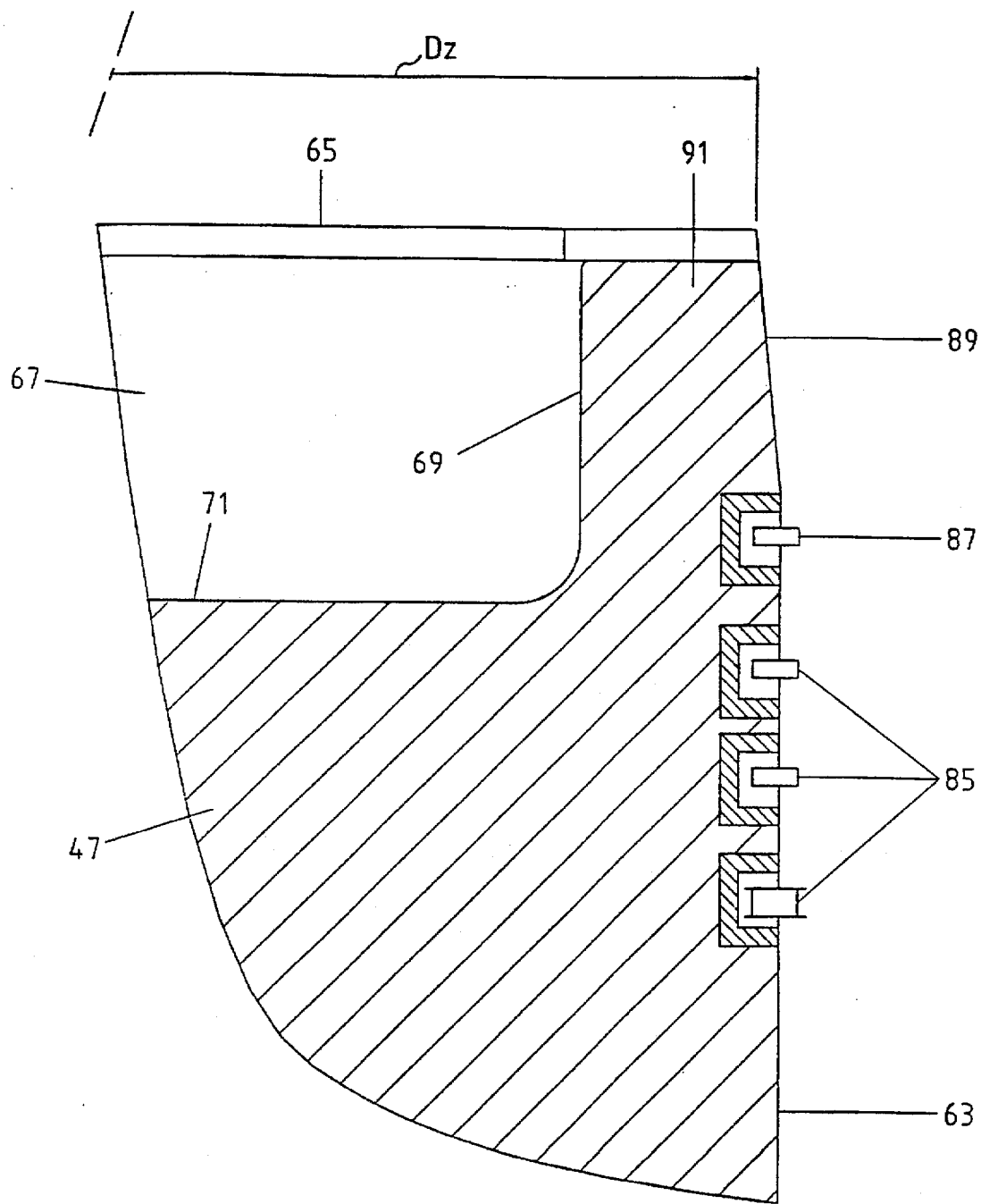
FIG. 5 shows a detail of the piston cross-section contained in FIG. 4, FIG. 6 gives a view of a cylinder head of the gas combustion engine, and FIG. 7 renders a cross-sectional view of a valve cover of the gas combustion engine.

FIG. 5 shows a detail of the piston 47, in proximity to the transition from the top surface 65 into the wall 63. The piston wall 63 is bevelled near the top surface, which bevelling 89 extends from the top surface 65 as far as the uppermost piston ring 87. As a result hereof, the diameter Dz of the piston 47 decreases from a first value, remote from the top surface, to a second value, at the position of the top surface. As a result hereof, the expansion of the piston wall 91 between the wall 63 and the wall 69 of the hollow, which is caused during operation by the combustion of the exhaust gases in the combustion space, is compensated for. The difference between the first value and the second value amounts to a few tenths of a millimeter. The bevelling as it is depicted in FIG. 5 is therefore strongly exaggerated, for purposes of clarity.

Figure 6:
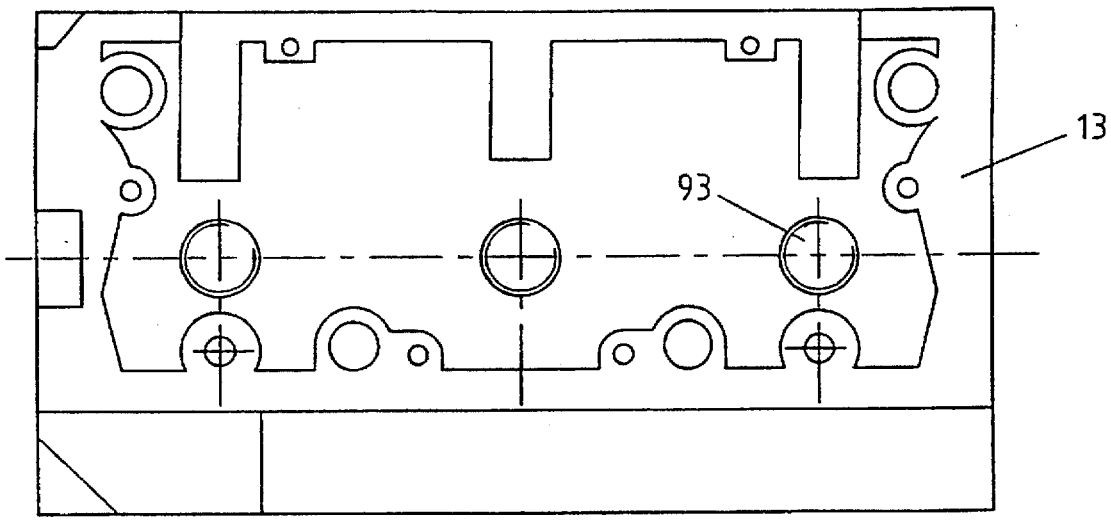
Figure 7:
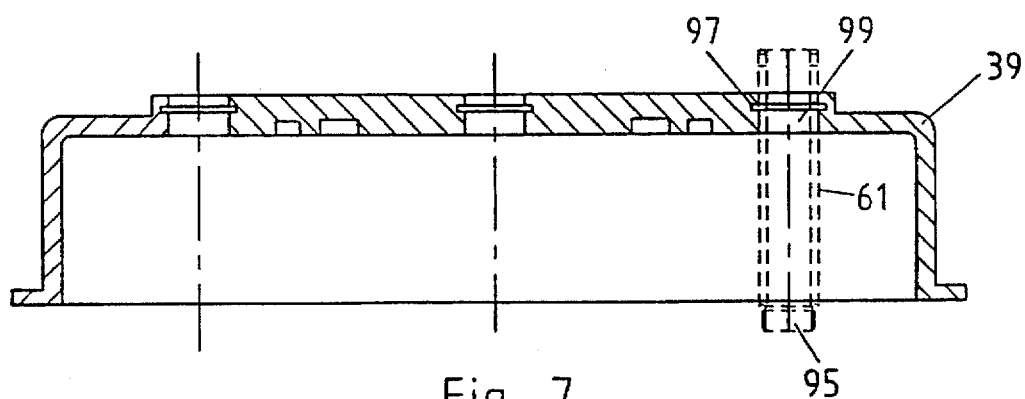

FIG. 6 depicts a cylinder head half 13 which is part of the cylinder head, the latter being split into two halves. Spark-plug mounting-openings 93 are located in the cylinder head half 13, which orifices 93 are formed by drill-widening the atomiser-openings already present in a diesel engine. The spark-plug mounting-bases 61, which are provided with an extremity having external screw thread, can be fitted within these spark-plug mounting-openings 93, which are provided with internal screw thread. In FIG. 7, a spark-plug mounting-base 61 of this type is depicted via a dashed outline within the valve lid 39. The spark-plug mounting-base 61 is provided at one end 95 with external screw thread, and is clamped near the other end by a ring 97 which is located in an opening 99 in the valve cover 39.

Furthermore, when converting a diesel engine to a gas combustion engine, the camshaft characteristic is altered in such a manner as to reduce the valve overlap (i.e. the length of time for which both the intake valve and the exhaust valve are open).

I claim:

1. Gas combustion engine comprising a gas exhaust system, an air intake system, an engine block comprising a number of cylinders and pistons, which pistons can be translated in the cylinders, and a cylinder head which delimits a space in the cylinders at one extremity, whereby a volume of the space in a cylinder between the cylinder head and a piston can be varied between a minimal and a maximal value by means of a translatory motion of the piston, a ratio of the said minimal and maximal values defining a compression ratio, a combustion space being defined by the space in that state of the piston which corresponds to a minimal volume, said gas combustion engine being a converted diesel engine, the combustion space and the compression ratio being adapted to application of gas as a fuel, wherein the pistons have a cylindrical wall and a top surface, a hollow being located in the top surface, which hollow forms part of the combustion space and has an approximately circle-cylindrical form and a substantially flat bottom and the hollow has a diameter and a depth, whereby the ratio of the diameter to the depth lies between 30:9 and 30:13, said cylindrical wall of each piston being bevelled near said top surface, an external diameter of each of said pistons decreasing from a first value adjacent a piston ring closest to said top surface to a second value at said top surface, said piston ring being one of a number of piston rings in the cylindrical wall of each of said pistons.

2. Gas combustion engine according to claim 1, wherein the exhaust gas system and the air intake system are also adapted to application of gas as a fuel.

3. Gas combustion engine according to claim 1, wherein said ratio of the diameter to the depth is approximately equal to 30:11.

4. Gas combustion engine according to claim 1, wherein the exhaust gas system comprises two exhaust branch-pieces, each of which is connected via a curved pipe to a separate catalyser, the exhaust gas system being remotely located from an axial line of a cylinder such that the cylinder head is freely accessible, when viewed in a transverse cross-section of the engine block.

5. Gas combustion engine according to claim 4, further comprising a lambda probe located in each of said pipes to provide information to an engine regulation unit.

6. Method of manufacturing a gas combustion engine as claimed in claim 1, said method comprising the steps of:
    enlarging a hollow in the top surface of the pistons both in diameter and in depth until a bottom of said hollow is approximately flat and said ratio of the diameter to the depth is obtained.

7. Method according to claim 6, further comprising the steps of adapting the exhaust gas system and the air intake system to an application of gas as a fuel.

8. Method according to claim 6, further comprising the step of bevelling the wall of the piston at an end of the piston which neighbours the top surface.

9. Method according to claim 6, further comprising the step of replacing the exhaust gas system of the diesel engine by, inter alia, two exhaust branch-pieces, each of which is connected to a separate catalyser.

10. Method according to claim 6, further comprising the steps of:

reducing a volume of an intake branch-piece; and coupling a gas carburettor to the intake branch-piece via a short pipe.

11. Method according to claim 6, further comprising the steps of enlarging, in diameter, atomiser openings already present in the cylinder head; and fitting spark-plug mounting-bases in said enlarged atomiser openings.

* * * * *